United States Patent
Tam

(10) Patent No.: US 8,352,356 B2
(45) Date of Patent: *Jan. 8, 2013

(54) SYSTEM AND METHOD FOR QUICK QUOTE CONFIGURATION

(75) Inventor: Simon Tam, Evanston, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/457,344

(22) Filed: Apr. 26, 2012

(65) Prior Publication Data

US 2012/0215674 A1 Aug. 23, 2012

Related U.S. Application Data

(63) Continuation of application No. 12/910,255, filed on Oct. 22, 2010, now Pat. No. 8,195,561, which is a continuation of application No. 12/559,502, filed on Sep. 15, 2009, now Pat. No. 7,844,541, which is a continuation of application No. 11/415,352, filed on May 1, 2006, now Pat. No. 7,599,880, which is a continuation of application No. 11/024,149, filed on Dec. 28, 2004, now Pat. No. 7,542,938.

(51) Int. Cl.
*G06Q 40/00* (2012.01)

(52) U.S. Cl. .......................................... 705/37; 705/35

(58) Field of Classification Search ...................... 705/37
See application file for complete search history.

(56) References Cited

U.S. PATENT DOCUMENTS

| | | | |
|---|---|---|---|
| 6,772,132 B1 | 8/2004 | Kemp | |
| 7,243,083 B2 * | 7/2007 | Burns et al. | 705/37 |
| 7,389,264 B2 * | 6/2008 | Kemp et al. | 705/37 |
| 7,437,325 B2 * | 10/2008 | Kemp et al. | 705/37 |
| 7,542,938 B1 | 6/2009 | Tam | |
| 7,599,880 B1 | 10/2009 | Tam | |
| 2003/0200167 A1 * | 10/2003 | Kemp et al. | 705/37 |
| 2010/0023443 A1 | 1/2010 | Tam | |
| 2011/0040674 A1 | 2/2011 | Tam | |

OTHER PUBLICATIONS

Chapman, Peter, A Program Weapons Race: Brokers and Vendors Launch more Products and Services. Traders Magazine. Apr. 1, 2004.

* cited by examiner

*Primary Examiner* — Lindsay M Maguire
*Assistant Examiner* — Hao Fu
(74) *Attorney, Agent, or Firm* — McDonnell Boehnen Hulbert & Berghoff LLP

(57) ABSTRACT

A method and system are described for providing a trader with the ability to quickly configure the quoting side of a trading tool, without experiencing the normal delays associated with conventional methods of quoting. In spread trading, an automated spread trading tool may automatically work an order to buy or sell a tradeable object. A user may configure the trading tool to work an order in a certain tradeable object first. The system allows the user to essentially on-the-fly configure the trading tool to work a second order in another tradeable object, and in response to the change, the system can take specific actions such as deleting the order in the first tradeable object and automatically entering the second order in the other tradeable object. This allows the trader to trade quickly and efficiently.

14 Claims, 6 Drawing Sheets

| Product 1 (Non-Hedging Side) | | | | | Product 2 (Hedging Side) | | | |
|---|---|---|---|---|---|---|---|---|
| Wrk Ord | Bid Qty | Price | Ask Qty | | Wrk Ord | Bid Qty | Price | Ask Qty |
|  |  | 304 |  |  |  |  | 449 |  |
|  |  | 303 |  |  |  |  | 448 |  |
|  |  | 302 |  |  |  |  | 447 | 145 |
|  |  | 301 | 160 |  |  |  | 446 |  |
|  |  | 300 | 245 |  |  |  | 445 | 250 |
|  |  | 299 | 115 |  |  |  | 444 | 225 |
|  |  | 298 | 175 |  |  |  | 443 | 350 |
| S 120 |  | 297 | 210 |  |  |  | 442 | 150 |
|  |  | 296 |  |  |  |  | 441 |  |
|  | 165 | 295 |  |  |  | 230 | 440 |  |
|  | 250 | 294 |  |  |  | 170 | 439 |  |
|  | 274 | 293 |  |  |  | 200 | 438 |  |
|  | 150 | 292 |  |  |  |  | 437 |  |
|  |  | 291 |  |  |  | 150 | 436 |  |

Trader enters an order to sell

FIG. 1

Product 1
(Non-Hedging Side)

| Wrk Ord | Bid Qty | Price | Ask Qty |
|---|---|---|---|
| | | 304 | |
| | | 303 | |
| | | 302 | |
| | | 301 | 160 |
| | | 300 | 245 |
| | | 299 | 115 |
| | | 298 | 175 |
| | | 297 | 90 |
| | | 296 | |
| | 165 | 295 | |
| | 250 | 294 | |
| | 274 | 293 | |
| | 150 | 292 | |
| | | 291 | |

Product 2
(Hedging Side)

| Wrk Ord | Bid Qty | Price | Ask Qty |
|---|---|---|---|
| | | 449 | |
| | | 448 | |
| | | 447 | 145 |
| | | 446 | |
| | | 445 | 250 |
| | | 444 | 225 |
| | | 443 | 250 |
| B 120 | | 442 | |
| | | 441 | |
| | 230 | 440 | |
| | 170 | 439 | |
| | 200 | 438 | |
| | | 437 | |
| | 150 | 436 | |

Best ask price just went up in price

Missed the market: now the hedge order should be moved to "443"

A hedge order is automatically sent at "442"

FIG. 2

SYSTEM AND METHOD FOR QUICK QUOTE CONFIGURATION

CROSS REFERENCE TO RELATED APPLICATIONS

The present application is a continuation of application Ser. No. 12/910,255, filed on Oct. 22, 2010, and issued on Jun. 5, 2012 as U.S. Pat. No. 8,195,561; the Ser. No. 12/910,255 application is a continuation of application Ser. No. 12/559,502, filed on Sep. 15, 2009, and issued on Nov. 30, 2010 as U.S. Pat. No. 7,844,541; the Ser. No. 12/559,502 application is a continuation of application Ser. No. 11/415,352, filed on May 1, 2006, and issued on Oct. 6, 2009 as U.S. Pat. No. 7,599,880; the Ser. No. 11/415,352 application is a continuation of application Ser. No. 11/024,149, filed on Dec. 28, 2004, and issued on Jun. 2, 2009 as U.S. Pat. No. 7,542,938. The entire contents of the Ser. Nos. 12/910,255; 12/559,502; 11/415,352; and 11/024,149 applications are incorporated by reference herein in their entirety.

TECHNICAL FIELD

The present invention relates generally to data processing systems for use in electronic trading and, more particularly, the present invention is directed to tools for use in electronic trading.

BACKGROUND

An automated trading tool gives a user the ability to set up a program that can respond automatically to patterns in market activity, and in response, submit orders directly to an electronic exchange. The use of such trading tools is on the rise and for good reason. Sophisticated trading tools can intelligently sense market conditions and automatically respond—often much faster than a human. Until recently, such sophisticated trading tools were available to a limited number of people. Now, in a marketplace where automated programs commonly trade against automated programs, in those circumstances, a manual-style trader may find it difficult to survive without some kind of automated assistance.

Automated trading tools are frequently used to hedge, which is a trading strategy made to reduce the risk of adverse price movements in a tradeable object, by taking an offsetting position in the same or a related tradeable object. For instance, a trader might execute a trade in one market (e.g., the "non-hedging" side), with the intention of quickly offsetting that position in another market (e.g., the "hedging" side). An automated trading tool is what most often performs at least the latter function—offsetting the position by quickly firing an order to the hedging side once the non-hedging order is matched. Hedging also includes taking an offsetting position in the same tradeable object, such that the market represents both the hedging side and the non-hedging side.

A trader might use an automated trading tool in this way to trade a spread, which generally refers to the buying and/or selling of two or more tradeable objects, the purpose of which is to capitalize on changes or movements in the relationships between the tradeable objects. The tradeable objects that are used to complete a spread are each descriptively referred to as a "leg" of the spread. A spread trade could involve buying tradeable objects, buying and selling tradeable objects, selling tradeable objects or some combination thereof. A spread trade might also involve the buying and selling of the same tradeable object—buying the tradeable object at one time and quickly offsetting that position by selling the tradeable object, or vice-versa.

As used herein, the term "tradeable object," refers simply to anything that can be traded with a quantity and/or price. It includes, but is not limited to, all types of tradeable events, goods, and financial products. For instance, stocks, options, bonds, futures, currency, and warrants, as well as funds, derivatives and collections of the foregoing, and all types of commodities, such as grains, energy, and metals may be considered tradeable objects. A tradeable object may be "real," such as products that are listed by an exchange for trading, or "synthetic," such as a combination of real products that is created by the user. A tradeable object could actually be a combination of other tradeable object, such as a class of tradeable objects.

A commercially available trading tool that facilitates the automatic trading of spreads is Autospreader™ from Trading Technologies International, Inc. of Chicago, Ill. Once the legs of the spread are chosen and the relationship between them are defined, a user can input a desired spread price and quantity, and the Autospreader™ will automatically work orders in the legs to achieve the desired spread (or attempt to achieve the spread). The Autospreader™ is currently an add-on tool available with X_TRADER® Pro™, which is a trading application also available from Trading Technologies International, Inc.

U.S. patent application Ser. No. 10/137,979, entitled, "System and Method for Performing Automatic Spread Trading," filed on May 3, 2002 describes one such automated spread trading tool. An example is provided herein to illustrate how an automated spread trading tool like that described in the above application might work. While the example illustrates hedging in a related tradeable object, the same concepts can be similarly applied to hedging in the same tradeable object.

The market information given in FIG. 1 is used to illustrate the following example. In particular, FIG. 1 displays example order book information for two hypothetical tradeable objects, referenced in the figure as product "1" and product "2." Each of the tradeable objects may be offered by one electronic exchange or separate electronic exchanges, it does not matter. The working orders column ("Wrk Ord") is shown in the far left columns, bid quantity is shown in the left columns ("Bid Qty"), the corresponding price—or some symbolic representation thereof—is shown in the center columns ("Price"), and the ask quantity is shown in the right columns for each tradeable object ("Ask Qty"). While presenting the order book information in this manner makes it easier to illustrate the following example, the actual layout of the order book information does not matter for this example.

The inside market for each tradeable object includes the best bid price (or sometimes referred to as the "highest bid") and the best ask price (or sometimes referred to as the "lowest ask"). The best bid price represents the highest price any buyer is willing to pay for a given tradeable object at a given time, and the best ask price represents the lowest price any seller is willing to sell a given tradeable object at a given time. The quantity available at the inside market and at other price levels is referred to as market depth. Referring to FIG. 1, at a current moment in time, the inside market for product "1" is bid at "295" and ask at "297." The quantity available for product "1" at the inside market is "165" at the bid and "210" at the ask. The inside market for product "2" is bid at "440" and ask at "442." The quantity available for product "2" at the inside market is "230" at the bid and "150" at the ask. Other bid and ask quantities at various price levels are also shown.

To begin, a trader will typically input certain parameters that the trader wishes to achieve by the spread trading tool, such as what tradeable objects to trade, what tradeable objects to quote, and a desired spread price. As an example, let us assume that the trader wishes to quote product "1" and hedge in product "2," and for purposes of description, the trader wishes to sell the spread, which refers to selling product "1" and buying product "2." Using this information, the automated spread trading tool will first automatically work a sell order (or multiple sell orders) for product "1." The price of the sell order is typically based on the desired spread price and the current best ask price of product "2" (the current best ask price is the lowest price for which product "2" can be bought). FIG. 1 shows that the spread trading tool has automatically entered an order to sell "120" at a price of "297," ("S 120"). When the sell order fills, then a corresponding hedge order is automatically sent to buy "120" (or some other designated amount) of product "2," at market to complete the spread. In other words, the spread trading tool is programmed to "fire off" a hedge order when one of the non-hedging orders is filled. The spread price actually achieved is based on the selling price of product "1" and the buying price of product "2." While the desired spread price is the price to aim for, the spread price actually achieved by selling product "1" and buying product "2" might be different from the desired spread price.

In some instances, however, during the time it takes to react to the order in product "1" getting filled, the market conditions of product "2" may move in an undesirable way. For instance, according to this example, if the inside market for product "2" moved up in value just before the hedge order was added to the order book at the exchange, then the order would miss the market (e.g., the best ask would now be higher than what was previously thought). Now, referring to FIG. 2 to illustrate this further, assume that the order to sell in product "1" was filled, and the automated trading tool fired off a hedge order to buy product "2." However, assume that the lowest ask price just moved up in price and the hedge order missed the market. Then, in an effort to complete the spread the trader will have to pay more (in this instance) than what he originally expected by moving his buy order to "443."—now, he will have to pay "443," which translates to one price higher for each of "120."

To avoid situations like this, a trader might notice the market moving in a direction before the above scenario actually occurs. In the instant example, it makes more sense to buy product "2" first, then hedge in product "1" with a sell order. That way, the trader would buy product "2" at a lower price (before it moved) and then offset that order by selling product "1." Assuming the trader can actively quote both legs, the trader might quickly—if not already too late, which is mostly the case—enter an order to buy product "2" with the hopes of catching the "wave." Then, if the order to buy product "2" is matched, the spread trading tool would automatically hedge in product "1." Unfortunately, the trader, in most circumstances, is not given the opportunity to delete all of his orders to sell product "1" leaving him with an open position. If he took the time to delete the orders and execute this new strategy, then he may have missed out on the opportunity.

As automated trading tools become the norm in electronic trading, it is increasingly important to develop more intelligent tools to assist the trader in making the most desirable trades.

BRIEF DESCRIPTION OF THE DRAWINGS

Many aspects of the present embodiments may be better understood with reference to the following drawings. The components in the drawings are not necessarily to scale, emphasis instead being placed upon illustrating example embodiments.

FIG. 1 is an illustration of example market information used to demonstrate how an automated spread trading tool might work to enter an order in a tradeable object;

FIG. 2 is an illustration of example market information, which occurs later in time than that shown in FIG. 1, used to illustrate how the automated spread trading tool might place an offsetting order in a second tradeable object;

DETAILED DESCRIPTION

I. Introductory Overview

The example system and method are appropriate for use in an electronic trading environment, and particularly, with tools made for quoting multiple tradeable objects. The example system allows a trader to quickly configure the quoting side of a trading tool, without the normal delays associated with conventional methods of quoting.

According to a particular embodiment described herein, an icon is placed on or nearby a trading screen that is used to select which tradeable object to quote. For instance, if a trader wishes to quote in one tradeable object, then the trading tool will automatically enter an order to buy or sell the tradeable object at a particular price, the order price of which is determined by a certain trading strategy. When a trader decides to quote in a different tradeable object than he is originally quoting, he can simply use the icon to select the new tradeable object to quote. In response, the example system can automatically enter a new order to buy or sell the new tradeable object at a price, the order price of which is also determined by a certain trading strategy. Additionally, the example system may be programmed to, upon choosing a different tradeable object to quote, automatically delete any working orders in the tradeable object for which he was originally quoting. As will be appreciated by one of skill in the art upon reading the description, this tool is especially important for use in any electronic trading systems, where orders can be entered at an exchange through a computer.

Other features and advantages will become apparent to one with skill in the art upon examination of the following drawings and examples. It is intended that all such features and advantages be included within the scope of the present invention, and be protected by the accompanying claims. Further, it will be appreciated by those of skill in the art that the preferred system may be provided as methods or computer readable program means.

II. An Example System Overview

Figure 3:
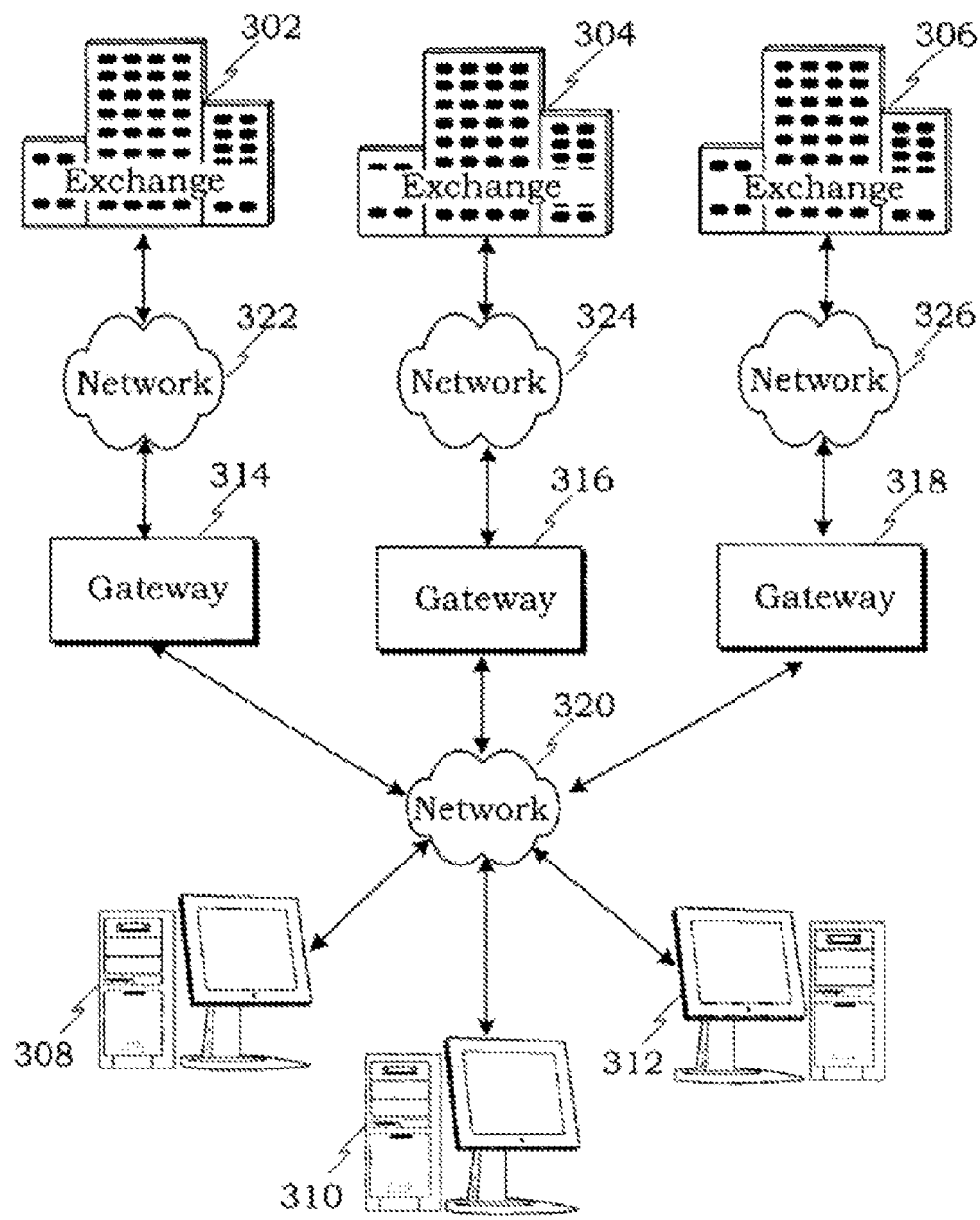
FIG. 3 is a block diagram of an example electronic trading environment, in which trading stations that utilize the example embodiments described herein are in communication with one or more electronic exchanges over a network.

FIG. 3 is a representation of an example electronic trading environment in which the example system and method may be employed. It is understood that the electronic trading environment is presented for the purposes of illustration and description, and it is not intended to limit the present embodiment to the precise environment disclosed; many modifications and variations of the environment are possible.

The electronic trading environment, as shown, generally includes computers that operate as the trading stations 308, 310, 312, electronic exchanges 302, 304, 306 and intermediary devices such as gateways 314, 316, 326 to interface with the exchanges 302, 304, 306. Networks 320, 322, 324, 326 are shown to illustrate the paths of communication between the various elements. It is understood that other hardware and software packages can lie between the trading stations 308, 310, 312 and the electronic exchanges 302, 304, 306. These may include third-party machines and devices, third-party networks, hardware and/or software configurations specific to the customer site and security measures like firewalls, hubs, security managers, and routers. It is also understood that fewer hardware and software packages might be utilized between the trading stations 308, 310, 312 and the electronic exchanges 302, 304, 306. For instance, a gateway may not be necessary in some circumstances for a trading station to communicate with an electronic exchange, or alternatively, a single gateway could communicate with multiple exchanges.

Software running on any of the trading stations 308, 310, 312 and the gateways 314, 316, 318 allow traders to log onto the electronic exchanges 302, 304, 306 to receive price and market depth information. A trading station is a computer such as a personal computer, laptop computer, hand-held computer, and so forth that runs trading related software and communicates with electronic exchanges 302, 304, 306 either directly or indirectly. The trading software may create specialized interactive trading displays, which enable the traders to, among other things, obtain market quotes, monitor positions, and submit orders to the exchange.

Figure 4:
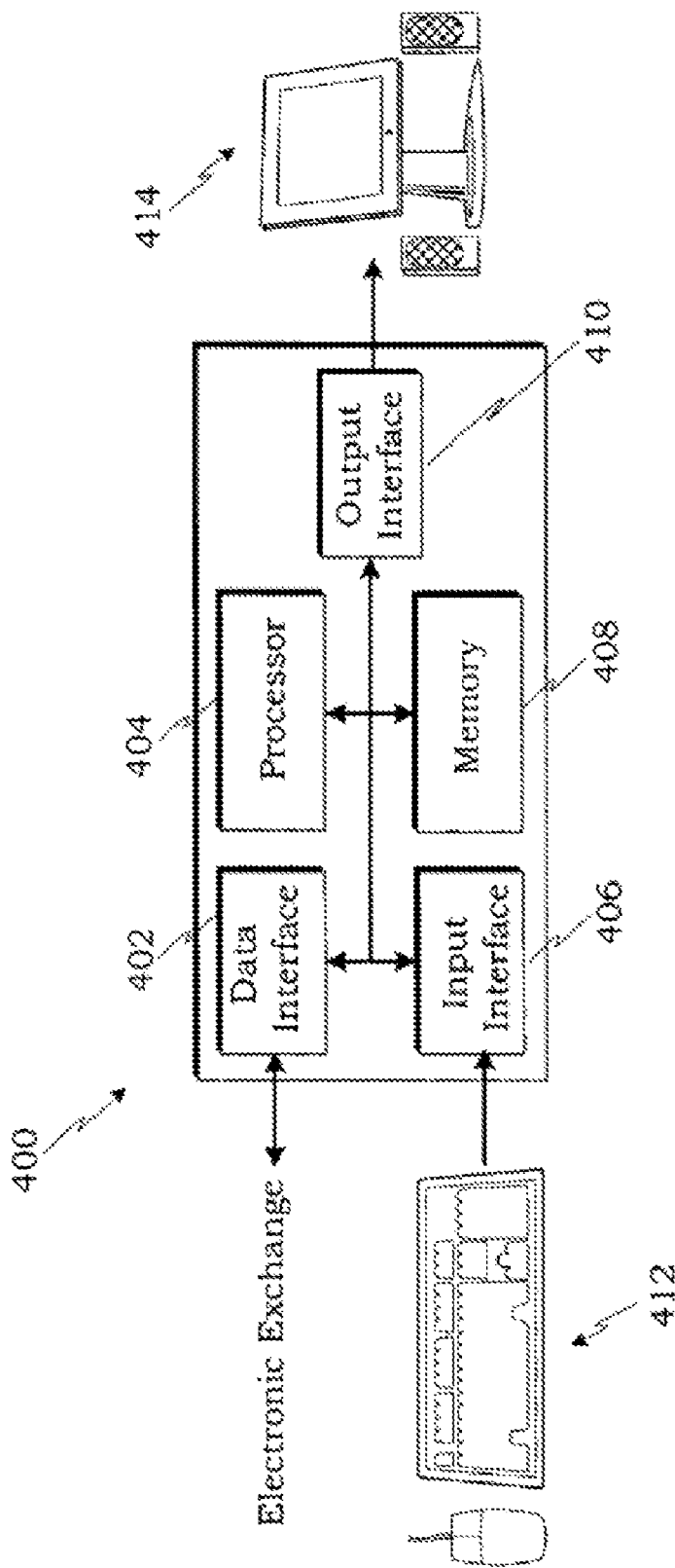
FIG. 4 is a block diagram of an example trading station shown in FIG. 3 for carrying out the example embodiments.

Any of the trading stations 308, 310, 312 may utilize the example system and method described herein. FIG. 4 illustrates more detail of an example trading station, referenced to by general reference character 400, that is capable of carrying out the example embodiments. The trading station 400 includes a data interface 402 for receiving one or more various data feeds, a processor 404 for executing the software, an input interface 406 for communicating with input device(s) 412, a memory section 408 for representing temporary and/or permanent storage used by the trading station 400, an output interface 410 for controlling display unit and/or speakers 414. The system 400 is illustrative of a computer system that is capable of executing programmed logic to execute the example embodiments, especially in the environment shown in FIG. 3. As indicated before, the systems shown in FIGS. 3 and 4 are illustrative and are not meant to be limiting.

Turning back to FIG. 3, orders are automatically sent from any of the trading stations 308, 310, 312 to any of electronic exchanges 302, 304, 306, and all matches between buyers and sellers are executed by the receiving exchange. If an order doesn't get matched, the order is placed in the exchange's order book, which generally consists of queues of unexecuted orders hopefully waiting for the price to move in their direction.

Each electronic exchange offers a real-time data feed to the trading stations 308, 310, 312 that provides a certain level of detail on the trading activity. From such data, it is possible to reconstruct parts, if not most or all, of the exchange's order book. Such information may be looked upon as an expression of market sentiment and may provide strategic guidance for order placement. These data feeds may be monitored by the example system to automate the order generation process.

While the level of detail in the data feed often depends on the electronic exchange or the tradeable object being traded, most data feeds provide the total quantity available at each of the best prices. The best bid price and the best ask price are referred to as the inside market. Market depth refers to the quantity at the inside market and quantity available at the next best prices. For instance, if an electronic exchange provides five levels of market depth in its data feed to its customers, then the aggregate quantity levels for the five best bids and the five best offers are offered in the data feed. Some electronic exchanges provide limited levels of market depth while others provide all of the market depth.

III. An Example Method Overview

Figure 5:
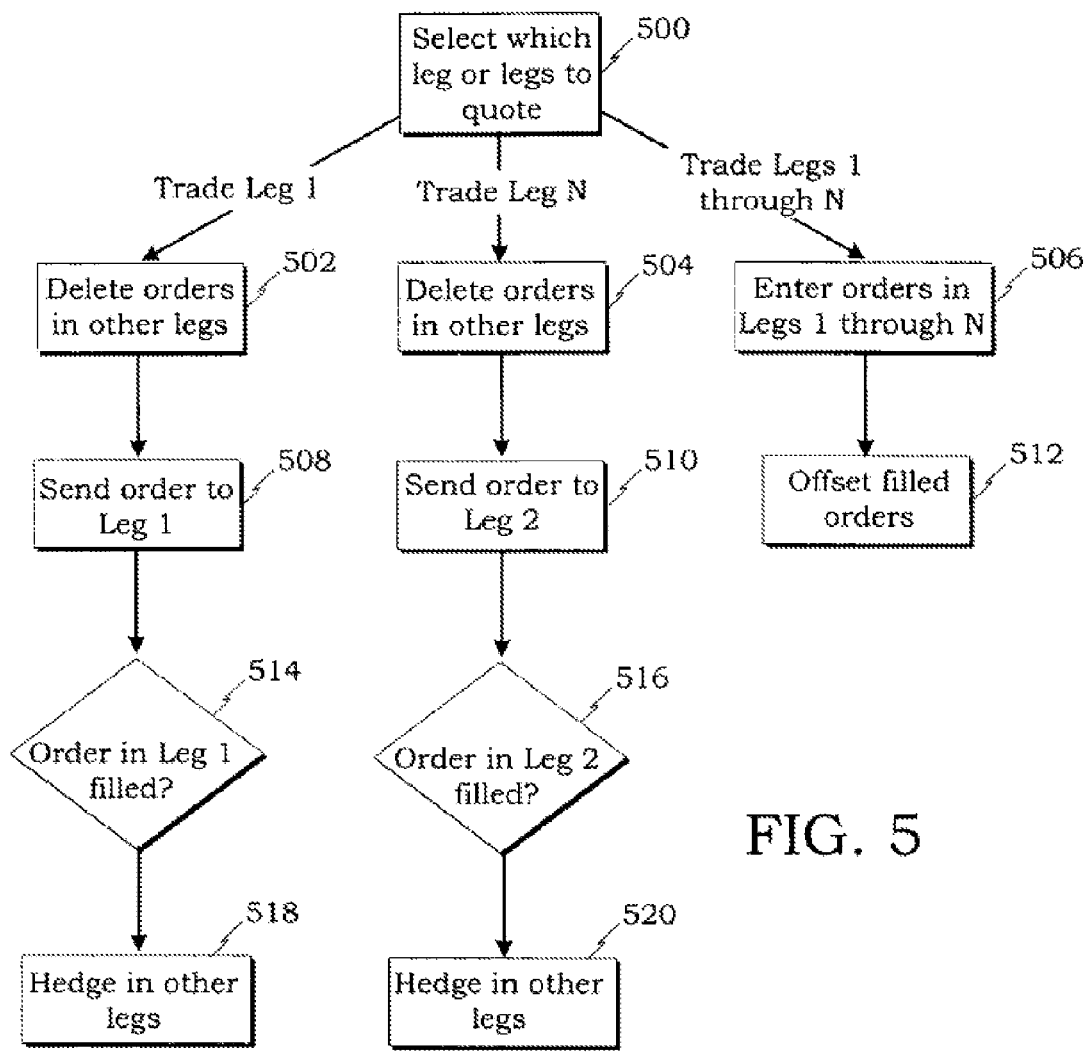
FIG. 5 is a flowchart illustrating an example method that may be carried out by the trading station of FIG. 4 in implementing the example embodiments.

FIG. 5 is a flow chart showing an example operation of which may be carried out by the example trading system 300 shown in FIG. 4. Each block in FIG. 5 may represent a module, segment, or portion of code, which includes one or more executable instructions for implementing specific logical functions or steps in the process. Alternate implementations are included within the scope of the preferred embodiments in which functions may be executed out of order from that shown or discussed, including substantially concurrently or in reverse order, depending on the functionality involved, as would be understood upon reading this description by those of skill in the art. Further, it is understood that some steps may not need to be implemented at all to achieve the desired result.

The method shown in FIG. 5 assumes that a spread trading strategy has been set up (or at least partly set up) so that two or more tradeable objects acting as legs are associated with a spread. A user might use functionality from any kind of automated spread trading tool, such as the Autospreader™, that allows one to set up a spread to trade. A trading tool that is automated refers to any computer implemented program or hardware device that performs a trading operation in an automatic or semi-automatic fashion on behalf of a user or trader.

Figure 6:
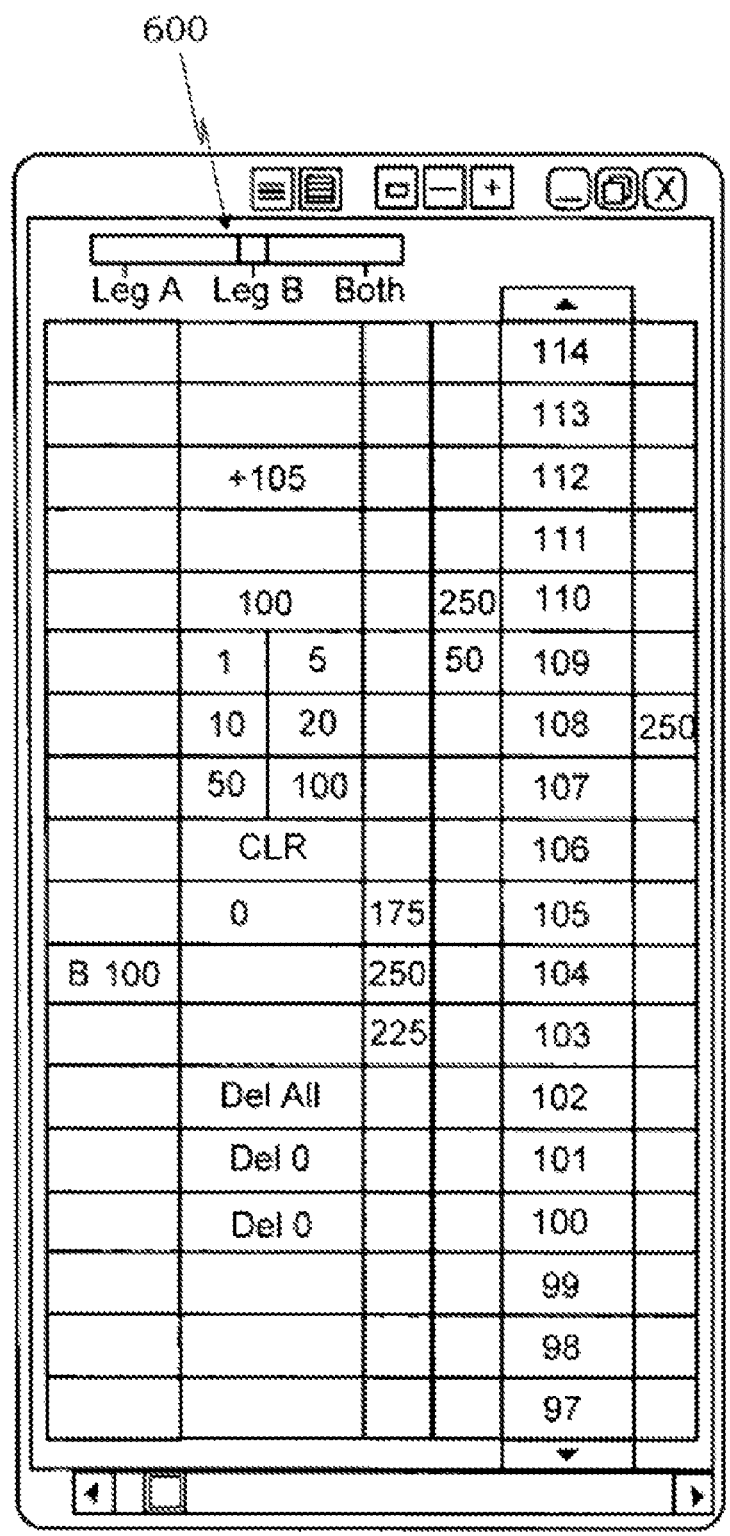
FIG. 6 is an illustration of a screen shot that shows an example mechanism for switching on-the-fly the tradeable object to quote.

At block 500, the user can select which tradeable object to quote. The user may do this by through a graphical user interface ("GUI"), which may represent a visual environment with graphical images, such as icons, menus, and dialog boxes on a screen. The user may select and activate these options by pointing and clicking with a mouse, selecting them with a keyboard, or by setting them with some other input device. It is also possible to set such parameters through something other than a graphical user interface, such as through command-line entry or programmed keys or hotkeys on a keyboard. To illustrate an example using a graphical interface, FIG. 6 shows a slider icon 600 used to dynamically switch between legs in a two-legged spread. The trader can simply move the slider 600 over the leg he wishes to quote. In this example, if the trader wanted to quote "Leg A" then, he can move the slider to "Leg A;" if the trader wanted to quote "Leg B" then, he can simply leave the slider where it is currently; if the trader wanted to quote both legs, then he can move the slider to "Both." It is understood that the label used to specify the legs can be more or less descriptive than what is shown in the figure. It is also understood that tradeable objects may be hosted at the same exchange or at different exchanges.

In addition, if more than two tradeable objects are being traded, then the slider 600 may also include options to choose the additional tradeable objects. For example, the display of slider icon 600 may dynamically change on the screen to accommodate any number of legs. So, for example, if a trader sets up a trading strategy involving four tradeable objects, then the slider will allow the trader to choose any of the four tradeable objects or all of them.

Referring again to FIG. 5, at block 502, if the slider is in the "leg 1" position, which means that the trader wishes to quote in "leg 1," then the example system preferably deletes any non-hedging orders in the other legs. If there remains a hedge order in the other legs that is needed to offset a position, then that hedge order may still be left in the order book and therefore not deleted. Here is an example to illustrate: if a trader was previously quoting in "leg 2" and had a non-hedging order working in "leg 2," but then the trader switched to quote "leg 1," the example system would preferably delete the order in "leg 2." If the working order in "leg 2" is a hedge order, then preferably the example system will leave the order working in the leg. It should be understood that a trader may not want to delete any orders (regardless of the order type), in which case, the trader can set up the example system not to delete; as such, the execution of block 502 would be skipped. While it is not necessary, it is preferred that the trader can elect whether to delete orders for each tradeable object separately.

The example given directly above illustrated an instance when the order in "leg 2" gets deleted as a result of switching the quoting leg. However, sometimes a trader might prefer to take some other action besides deleting an order. Therefore, the example system may be programmed to perform other actions on the order, such as deleting the order only after a predetermined timeout, moving the order to a price that is further off the inside market than the current order price, changing the order quantity (such as by deleting only a portion of the order quantity), changing the order type, or take any other user definable action on the order.

At block 504, the slider is in "leg N" position, which means that the trader wishes to quote in "leg N," where "N" represents a number representing any of the legs. In this mode, the example system deletes any orders in the legs besides "leg N" that are not considered hedge orders. Again, the trader may choose to not delete any orders, in which case, the example system would skip block 504.

At block 506, the slider is in a trade all legs mode. Similar to the "Both" option shown in FIG. 6, when a trader wishes to actively trade in all of the legs, he may choose to do so and the example system will preferably enter orders automatically at prices, determined by a trading strategy, to buy or sell each of the legs according to the trading strategy. If a non-hedging order was already placed in a leg (before switching to this option), then upon instruction by the user (e.g., preferably instruction given in advance), the system may not delete the order and will not to enter a new order. In other words, if an order is already working in a leg before a quoting selection is made, there is no need to delete it only to replace it again with a new order; thus, the previously existing order may continue to rest in the order book for that particular leg. It is preferred that the user can determine whether to keep previously existing orders in this manner or to simply replace them with new orders. This user instruction may be input in advance of such determination by the system.

At blocks 508 and 510, an order is automatically sent at a price, determined by a trading strategy, to buy or sell the new tradeable object. Here is an example to illustrate. Suppose a trader sets up a trading strategy involving two tradeable objects, designated "leg 1" and "leg 2." In this instance, the trading strategy is an instruction to achieve the trader's desired spread price. To accomplish this trading strategy, the example system could automatically enter an order in "leg 1" at a price based on the inside market price of "leg 2" in an attempt to achieve the spread, or alternatively, the system could automatically enter an order in "leg 2" at a price based on the inside market price of "leg 1" in an attempt to achieve the spread. If "leg 1" is the quoting leg (based on the trader's input at block 500), then the example system perform the former operation—automatically enter an order in "leg 1" first. If "leg 2" is the quoting leg (based on the trader's input at block 500), then the example system would perform the latter operation—automatically enter an order in "leg 2" first.

In another embodiment, instead of automatically entering an order on behalf of the trader, the trader is free to send a working order to the quoting leg. For instance, according to block 508, the trader can send working orders to "leg 1;" according to block 510, the trader can send working orders to "leg N." While trading, if the trader wishes to quote another leg (e.g., switch from "leg 1" to "leg 2," or vice-versa), he or she may do so, in which, the method would preferably start again at block 500.

At blocks 514 and 516, the spreading tool may determine if the working order has filled, and if so, then the tool may offset the order with an offsetting order per blocks 518 and 520. This automatic functionality allows the trader to quickly (almost immediately) fire off a hedge order per the following blocks.

At blocks 512, 518, and 520 when a working order is filled, an offsetting order is preferably sent to the programmed destination. So, for instance, in a two-legged spread, if an order was first placed in "leg 1" and it is filled, then immediately an offsetting order will be sent to "leg 2." Or, if an order was first placed in "leg 2" and it is filled, then immediately an offsetting order will be sent to "leg 1."

FIG. 6 shows an example graphical interface for displaying market information pertaining to a spread. Details regarding the graphical interface are described in U.S. Pat. No. 6,772,132, entitled "Click Based Trading with Intuitive Grid Display of Market Depth," the contents of which are incorporated herein by reference. The graphical interface may be used to display the spread or one of the spread's legs. If the graphical interface is used to display the spread, the user could simply trade the spread through this one particular window. So, when the user places an order to buy or sell the spread in the spread window, the automated spread trading tool will preferably automatically place and work order (or orders) in the legs to achieve the desired spread price. Sometimes, however, a user might want to also view the legs of the spread, in which case three or more windows might be displayed at the trading station—one window to display the spread, a second window to display market information corresponding to one leg, and a third window to display market information corresponding to a second leg, and so on.

The graphical interface provides a way to quickly select which legs to quote. Slider 600 is one way to accomplish the selection. Other ways include on-screen buttons that can be selected by a user through a mouse input or keyboard, for example; like the slider, the buttons could be placed on any or all of the windows albeit the spread window or one of the windows displaying a leg. If the mechanism by which selection takes place is displayed on more than one window, then it is preferred that when a user changes the selection using one button or slider that the other buttons or sliders are automatically updated to display which leg or legs is currently being quoted.

Further, it is possible to implement the present feature in hardware by providing a mechanical way to select which leg to quote. For instance, a keyboard specifically designed for trading might provide this feature to provide the user with the ability to change quoting legs. A hard key, switch, mechanical slider, or some other mechanical or electro-mechanical mechanism could be used to send signals to the example system.

Further yet, it is possible to allow another computer software or hardware program to actively control which legs are being quoted (e.g., rather than requiring the user to make the selection). According to this example embodiment, a user might have a program that can predict with some degree of confidence which legs should be quoted and which legs should be hedged into. Such a program might take into account the momentum of the market, or other factors, to determine at an instant the direction in which the market is headed. Once the market direction is determined, the program can use the example system to select or change the leg being quoted.

V. Conclusion

There are many advantages for providing a quick quote configuration when trading multiple tradeable objects. One possible advantage is if the trader recognizes a shift in market movement, and because of the shift it would be better to quote a different tradeable object first (rather than quoting it second or sometime later), then the trader can quickly do so by switching between tradeable objects using the embodiments described herein. For instance, if the trader was going to buy tradeable object "1" first, and then immediately offset a fill by selling tradeable object "2" at market price—the trader might recognize that the market for tradeable object "2" is actually going down in value and thus she would want to sell tradeable object "2" first and then buy tradeable object "1." While either approach will complete a spread, the latter approach (selling tradeable object "2" first) might result in achieving a more desirable spread price. Using the tools described herein, the trader can dynamically and effectively make this switch without losing valuable time.

Although the example programs, processes, methods and system has been described and illustrated in detail, it is clearly understood that the same is by way of illustration and example only and is not to be taken by way of limitation. Since numerous modifications and changes will readily occur to those skilled in the art, it is not desired to limit the invention to the exact construction and operation shown and described, and accordingly, all suitable modifications and equivalents may be resorted to, falling within the scope of the invention.

According to one embodiment, the example system takes the form of a computer program product that is stored on a computer readable storage medium and is executed by a suitable instruction execution system in the computer-based device. The term computer readable medium, as used herein, refers to any medium that participates in providing instructions to processor for execution. Such a medium may take many forms, including but not limited to, non-volatile media, volatile media, and transmission media. Non-volatile media includes, for example, optical or magnetic disks, such as storage device. Volatile media includes dynamic memory, such as main memory or RAM (random access memory). Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, and any other memory chip or cartridge, or any other medium from which a computer can read.

According to an alternative embodiment, a hardware embodiment might take a variety of different forms. A hardware embodiment may be implemented as an integrated circuit with custom gate arrays or an application specific integrated circuit ("ASIC"). A hardware embodiment may also be implemented with discrete hardware components and circuitry. In particular, it is understood that the logic structures and method steps described in the flow diagrams may be implemented in dedicated hardware such as an ASIC, or as program instructions carried out by a microprocessor or other computing device.

What is claimed is:

1. A method including:
    detecting by a computing device a market direction change for a leg market of a trading strategy, wherein the trading strategy includes a first leg for a first tradeable object and a second leg for a second tradeable object, wherein the first leg is initially selected to be quoted and the second leg is initially selected to be hedged;
    dynamically switching by the computing device the selection of the leg to be quoted and the leg to be hedged based on the detected market direction change, wherein the second leg is selected as the leg to be quoted and the first leg is selected as the leg to be hedged;
    automatically initiating sending by the computing device a first message to a first electronic exchange to delete an order for the first tradeable object in response to dynamically switching the selection; and
    automatically initiating sending by the computing device a second message to a second electronic exchange to place an order for the second tradeable object in response to dynamically switching the selection, wherein the order for the second tradeable object has a price based on a desired strategy price for the trading strategy and market conditions of the first tradeable object.

2. The method of claim 1, wherein the first electronic exchange is the same as the second electronic exchange.

3. The method of claim 1, wherein the first electronic exchange is different than the second electronic exchange.

4. The method of claim 1, wherein the market conditions for the first tradeable object include at least one of a best bid price and a best ask price for the first tradeable object.

5. The method of claim 1, wherein the trading strategy further includes a third leg for a third tradeable object, wherein the third leg for the third tradeable object is initially selected to be hedged.

6. The method of claim 5, wherein the price of the order for the second tradeable object is further based on market conditions for the third tradeable object.

7. The method of claim 1, further including:
    providing by the computing device an indicator identifying which of the first leg and the second leg is currently selected to be quoted.

8. A computer readable storage medium having stored therein instructions executable by a processor, wherein the instructions are executable to:
    detect a market direction change for a leg market of a trading strategy, wherein the trading strategy includes a first leg for a first tradeable object and a second leg for a second tradeable object, wherein the first leg is initially selected to be quoted and the second leg is initially selected to be hedged;
    dynamically switch the selection of the leg to be quoted and the leg to be hedged based on the detected market direction change, wherein the second leg is selected as the leg to be quoted and the first leg is selected as the leg to be hedged;
    automatically initiate sending a first message to a first electronic exchange to delete an order for the first tradeable object in response to dynamically switching the selection; and
    automatically initiate sending a second message to a second electronic exchange to place an order for the second tradeable object in response to dynamically switching the selection, wherein the order for the second tradeable object has a price based on a desired strategy price for the trading strategy and market conditions of the first tradeable object.

9. The computer readable medium of claim 8, wherein the first electronic exchange is the same as the second electronic exchange.

10. The computer readable medium of claim 8, wherein the first electronic exchange is different than the second electronic exchange.

11. The computer readable medium of claim 8, wherein the market conditions for the first tradeable object include at least one of a best bid price and a best ask price for the first tradeable object.

12. The computer readable medium of claim 8, wherein the trading strategy further includes a third leg for a third tradeable object, wherein the third leg for the third tradeable object is initially selected to be hedged.

13. The computer readable medium of claim 12, wherein the price of the order for the second tradeable object is further based on market conditions for the third tradeable object.

14. The computer readable medium of claim 8, wherein the instructions are further executable to:
provide an indicator identifying which of the first leg and the second leg is currently selected to be quoted.

* * * * *